Nov. 15, 1949     R. J. KLEIN     2,488,203
HANDLE BRAKE

Filed July 1, 1947     2 Sheets-Sheet 1

INVENTOR.
Raymond J. Klein
BY
McMorrow, Berman & Davidson
ATTORNEYS

Nov. 15, 1949      R. J. KLEIN      2,488,203
HANDLE BRAKE
Filed July 1, 1947      2 Sheets-Sheet 2
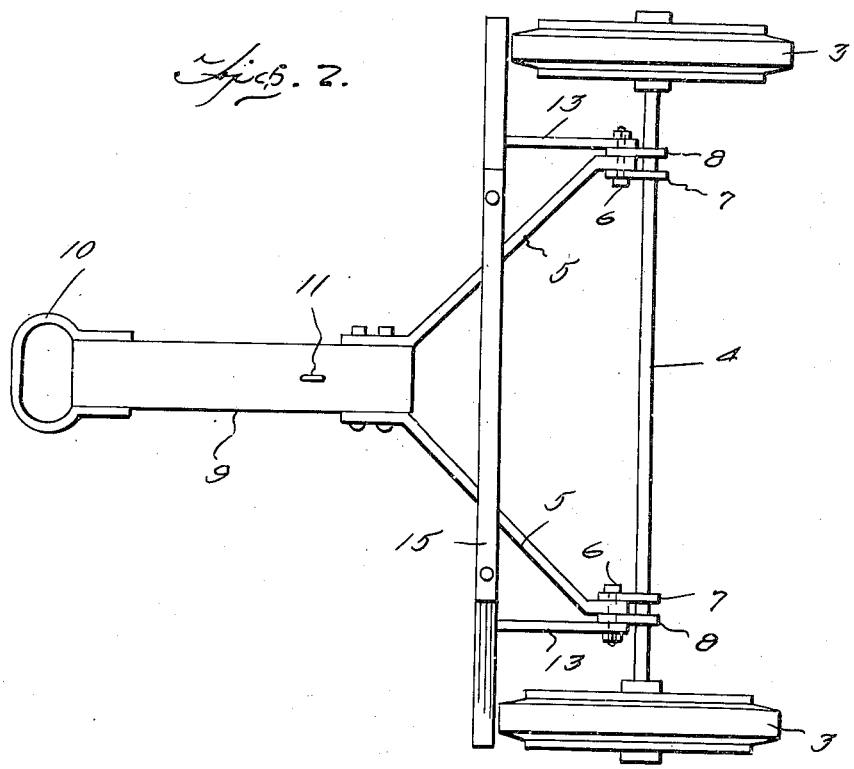
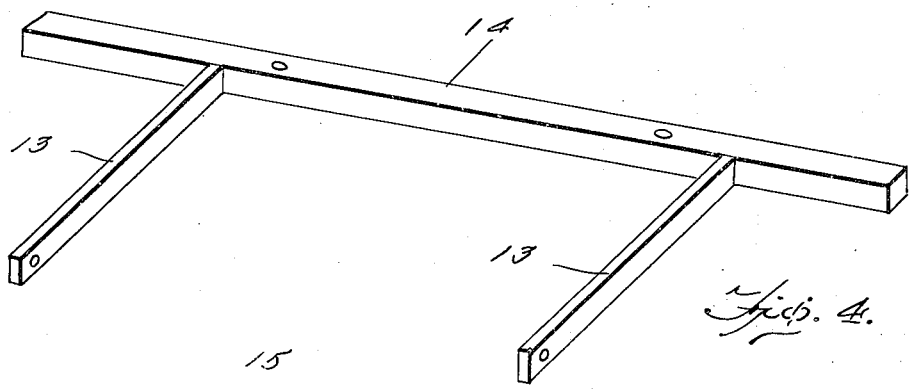
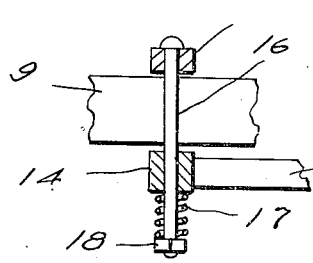
INVENTOR.
Raymond J. Klein
BY
McMorrow, Berman & Davidson
ATTORNEYS

Patented Nov. 15, 1949

2,488,203

UNITED STATES PATENT OFFICE 2,488,203

HANDLE BRAKE

Raymond J. Klein, Syracuse, N. Y.

Application July 1, 1947, Serial No. 758,240

4 Claims. (Cl. 188—119)

This invention relates to improvements in brakes for platform trucks and is particularly directed to brake means automatically set and released depending on the position of the truck handle.

Conventional mail and baggage trucks are not provided with brakes as such, but have a chain secured at one end to the body of the truck with its other end free to be clamped about one of the truck wheels to prevent same from turning. This manner of securing a platform truck is both inefficient and time consuming.

A principal object of the present invention is to provide a brake attachment for platform trucks which is simple in construction, positive, efficient, and automatic in operation.

A further object is to provide a brake mechanism which is automatically operable in accordance with the position of the handle by which the truck is pulled or towed.

Other objects and advantages reside in details of design and construction which will be more fully disclosed in the following description and in the drawings wherein like parts have been similarly designated and in which:

Figure 2 is a plan view of the structure shown in Figure 1 with the body of the truck removed.

Figure 4 is a perspective view showing the construction of the brake bar.

Figure 5 is a fragmentary view in section showing the manner by which the brake bar and horizontal bars are secured.

Figure 1:
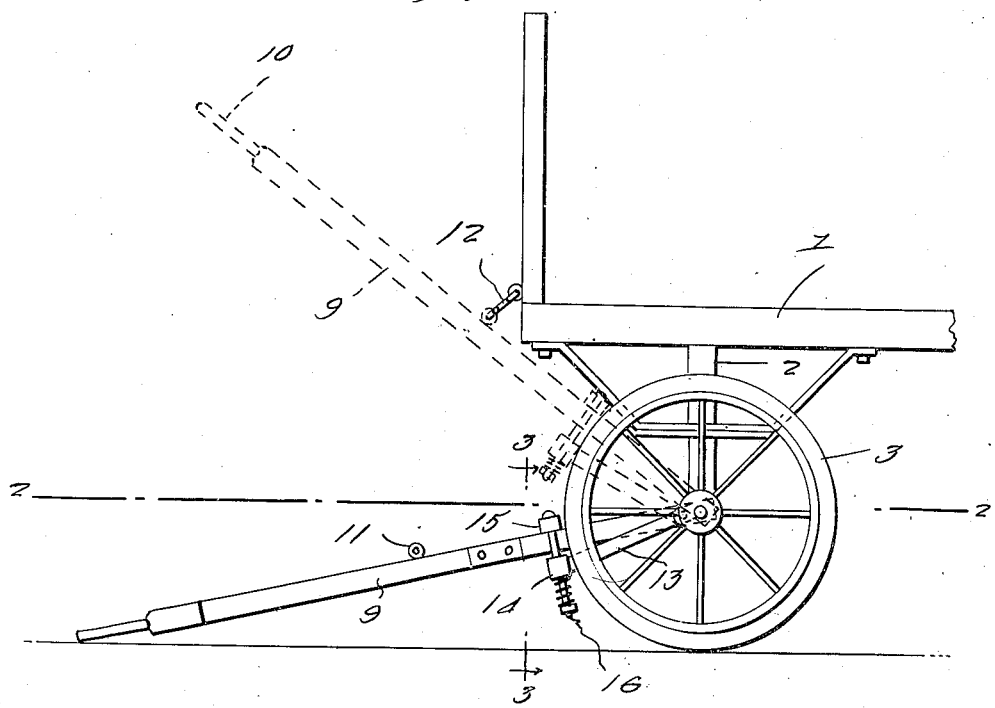
Figure 1 is a view in elevation of the forward end of a platform truck shown only in part.

Referring now more particularly to the accompanying drawings wherein the invention is illustrated in connection with a conventional platform truck used to convey baggage, mail, etc., the numeral 1 designates the forward end of the platform truck mounted on a king bolt assembly 2 which permits the turning in either direction of the front wheels 3 and axle 4. A pair of handle braces 5 is each secured at one end to the axle 4 by means of the bolt 6 and plates 7 and 8, and at the other end to a draw bar 9. A handle 10 is attached to the free end of the draw bar 9 and an eye bolt 11 is secured on the upper surface thereon so that when the draw bar is in its upward position as shown in dotted lines in Figure 1, hook 12 which is secured to the body 1 of the platform truck can be fitted into the eye bolt to hold the drawbar 9 and handle 10 in that position securely.

Figure 3:
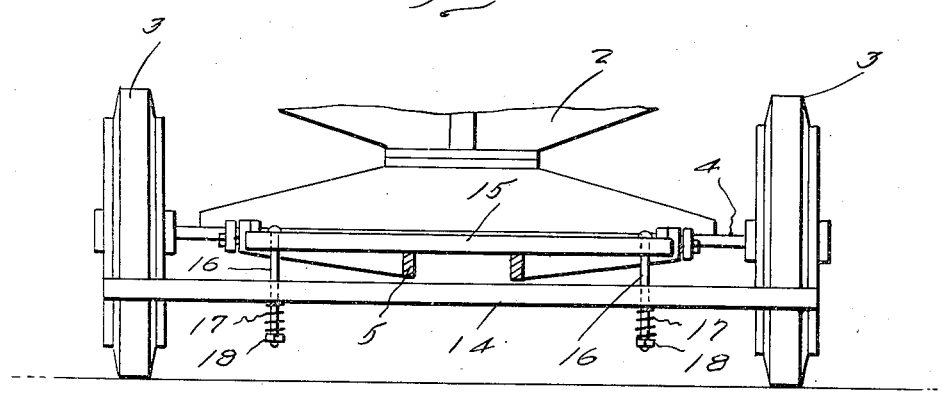
Figure 3 is a section taken in the plane indicated by the line 3—3 of Figure 1.

Rotatably mounted on the bolts 6, 6 are a pair of arms 13 each secured at their free ends to a brake bar 14 which extends horizontally in close spaced relation to the front wheels 3, 3, mounted below the draw bar 9 (see Figures 2 and 4). A second horizontal bar 15 shorter in length than the brake bar 14 is mounted above the draw bar 9 and secured at each end to the brake bar 14 by means of a pair of long bolts 16, 16, each having a compression spring 17, 17 positioned between the brake bar 14 and the nuts 18 threaded on the free ends of the bolts 16, 16 (see Figures 3 and 5).

It is to be noted that arms 13 are of such length that in their lowered position the brake bar 14 is in close spaced relation to the wheels 3, 3. Due to the fact that the pivot bolts 6, 6 are forward of the axle 4, the brake bar 14 frictionally engages the front wheels when forced upwardly. Consequently, when the handle 10 is in the lowered position, that is, when the platform truck is being pulled or towed, the brake bar 14 is not in contact with the wheels 3, 3. As the handle 9 is lifted to secure the hook 12 in the eye bolt 11, the brake bar 14 frictionally engages the wheels 3, 3 causing the springs 17, 17 to compress until the handle 9 is in position to be secured by the eye bolt 12. The wheels 3, 3 are now firmly locked and the platform truck cannot be moved. Upon disengaging the hook 12 from the eye bolt 11 the handle 10 is lowered causing the brake assembly to swing downwardly and the brake bar 14 becomes disengaged from the wheels 3, 3.

While this specification discloses a preferred embodiment for reducing the present invention to practice, changes may be made by those skilled in the art within the scope of the appended claims without departing from this inventive concept.

What I claim and desire to secure by Letters Patent is:

1. A brake for a platform truck having a front wheel and axle assembly and a vertically swingable handle pivoted thereto, said brake comprising a transverse brake bar, pivot means pivoting said brake bar to said assembly on an axis located forwardly of said axle whereby in a depressed position of said brake bar said brake bar is forwardly spaced from said wheel and in an elevated position of said brake bar said brake bar is in braking engagement with said wheel, and vertically acting spring means operatively connecting said brake bar to said handle and permitting limited vertical movement between said handle and said brake bar.

2. A brake for a platform truck having a front wheel and axle assembly and a vertically swingable handle pivoted thereto, said brake comprising a transverse brake bar, pivot means pivoting said brake bar to said assembly on an axis located forward of said axle whereby in a depressed position of said brake bar said brake bar is forwardly spaced from said wheel and in an elevated position of said brake bar said brake bar is in braking engagement with said wheel, and vertically acting spring means operatively connecting said brake bar to said handle and permitting limited vertical movement between said handle and said brake bar, said spring means comprising a second bar paralleling said brake bar and resting upon the upper side of said handle, a vertical guide rod on said second bar slidably traversing said brake bar, and an expanding spring compressed between said brake bar and a portion on said guide rod.

3. A brake for a platform truck having a front wheel and axle assembly and a vertically swingable handle pivoted thereto, said brake comprising a transverse brake bar, pivot means pivoting said brake bar to said assembly on an axis located forwardly of said axle whereby in a depressed position of said brake bar said brake bar is forwardly spaced from said wheel and in an elevated position of said brake bar said brake bar is in braking engagement with said wheel, and vertically acting spring means operatively connecting said brake bar to said handle and permitting limited vertical movement between said handle and said brake bar, said brake bar being located beneath said handle, said spring means comprising a second bar paralleling said brake bar and overlying said handle, a guide rod depending from said second bar and slidably traversing said brake bar and having a stop on its lower end, and an expanding spring compressed between said stop and the underside of said brake bar and arranged to be further compressed to maintain said brake bar in braking engagement with said wheel in the elevated position of said handle.

4. A brake for a platform truck having a front wheel and axle assembly and a vertically swingable handle pivoted thereto, said brake comprising a transverse brake bar, pivot means pivoting said brake bar to said assembly on an axis located forwardly of said axle whereby in a depressed position of said brake bar said brake bar is forwardly spaced from said wheel and in an elevated position of said brake bar said brake bar is in braking engagement with said wheel, and vertically acting spring means operatively connecting said brake bar to said handle and permitting limited vertical movement between said handle and said brake bar, said handle being pivoted to said assembly coaxially with the axis of said brake bar in a manner to permit independent pivotal action of said handle and said brake bar limited only by the action of said vertically acting spring means.

RAYMOND J. KLEIN.

REFERENCES CITED

The following references are of record in the file of this patent:

UNITED STATES PATENTS

| Number | Name | Date |
|---|---|---|
| 1,950,274 | Sullivan et al. | Mar. 6, 1934 |
| 2,215,765 | Petersen | Sept. 24, 1940 |
| 2,257,618 | Petersen | Sept. 30, 1941 |